United States Patent
Tsuruoka et al.

(10) Patent No.: US 9,798,059 B2
(45) Date of Patent: Oct. 24, 2017

(54) GRID POLARIZING ELEMENT

(71) Applicant: USHIO DENKI KABUSHIKI KAISHA, Tokyo (JP)

(72) Inventors: Kazuyuki Tsuruoka, Yokohama (JP); Ryuhei Araki, Yokohama (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/556,474

(22) Filed: Dec. 1, 2014

(65) Prior Publication Data

US 2015/0160391 A1 Jun. 11, 2015

(30) Foreign Application Priority Data

Dec. 11, 2013 (JP) .................................. 2013-255600

(51) Int. Cl.
*G02B 5/30* (2006.01)
*G02B 27/00* (2006.01)

(52) U.S. Cl.
CPC .......... *G02B 5/3075* (2013.01); *G02B 5/3058* (2013.01); *G02B 27/0006* (2013.01)

(58) Field of Classification Search
CPC ................ G02B 5/3075; G02B 5/3058; G02B 27/0006; G02B 5/30; G02B 5/3025
USPC ......... 359/485.05, 352, 486, 483.01, 487.03, 359/489.06
See application file for complete search history.

(56) References Cited

U.S. PATENT DOCUMENTS

| 8,094,373 | B2 | 1/2012 | Kumai |
| 9,448,348 | B2 * | 9/2016 | Jeong .................. H01L 51/5281 |
| 2008/0055723 | A1 * | 3/2008 | Gardner ............... G02B 5/3058 359/487.03 |
| 2015/0002791 | A1 * | 1/2015 | Nam .................... G02B 5/3058 349/96 |

FOREIGN PATENT DOCUMENTS

| JP | 2007-017762 A | 1/2007 |
| JP | 2009-069382 A | 4/2009 |

OTHER PUBLICATIONS

Hong et al. "Silicon nanowire grid polarizer for very deep ultraviolet fabricated from a shear-aligned diblock copolymer template." Optics Letters. vol. 32, No. 21. Nov. 2007.*

* cited by examiner

*Primary Examiner* — Ricky Mack
*Assistant Examiner* — Kristina Deherrera
(74) *Attorney, Agent, or Firm* — Studebaker & Brackett PC

(57) ABSTRACT

A grid polarizing element has a structure that can prevent deteriorations due to an oxidization gas. The grid polarizing element is preferably used to polarize light in a ultraviolet light region. The grid polarizing element includes a transparent substrate and a grid layer disposed on the transparent substrate. The grid layer has a plurality of linear portions, and is shaped like a stripe. The grid layer is covered with a gas blocking layer to block the oxidization gas generated by the ultraviolet light such as ozone and active oxygen species. The gas blocking layer is transparent at a wavelength of the light to be polarized.

13 Claims, 8 Drawing Sheets

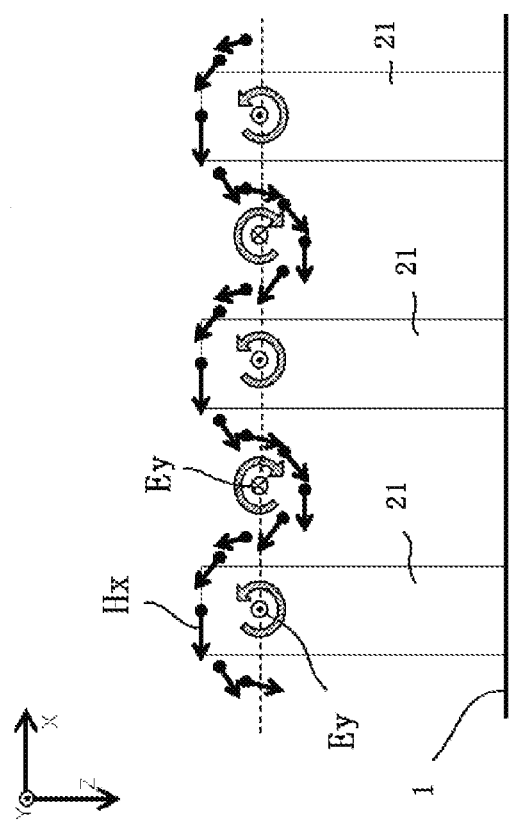

| LOAD | LIGHT PERMEABILITY | EXTINCTION RATIO |
|---|---|---|
| WITHOUT LOAD | 41.6% | 231 |
| WITH LOAD | 33.5% | 2 |

FIG. 8A

| LOAD | LIGHT PERMEABILITY | EXTINCTION RATIO |
|---|---|---|
| WITHOUT LOAD | 39.9% | 283 |
| WITH LOAD | 34.4% | 254 |

FIG. 8B

GRID POLARIZING ELEMENT

FIELD OF THE INVENTION

The present invention relates to a grid polarizing element. The grid polarizing element is one type of a polarizer.

DESCRIPTION OF THE RELATED ART

Polarizing elements (polarizers) designed to obtain polarized light (beam, ray) are known in the form of variety products such as customer goods (e.g., polarized sunglasses) and optical elements (e.g., polarizing filters and polarizing films). Such polarizing elements are also used in various types of display devices such as liquid crystal display devices. In general, the polarizing elements can be categorized into a plurality of groups depending upon a method of extracting polarized light. One of the groups is a wire grid polarizer.

The wire grid polarizer includes a transparent substrate and a fine stripe grid disposed on the transparent substrate. The grid is made from a metal (conductive material). The grid has a number of linear portions spaced from each other. The wire grid polarizer can function as a polarizing element because the gap (pitch) between each two adjacent linear portions is equal to or smaller than the wavelength of light to be polarized. The wire grid polarizer is equivalent to a flat metal for that polarized light, among the linearly polarized light, which has an electric field component in a longitudinal direction (length direction) of the grid. Thus, the wire grid polarizer reflects such polarized light. On the other hand, the wire grid polarizer is equivalent to the only transparent substrate for that polarized light, among the linearly polarized light, which has the electric field component in a direction perpendicular to the longitudinal direction (length direction) of the grid. Thus, the wire grid polarizer allows such polarized light to pass (transmit) through the transparent substrate and become the outgoing light (emitted light). Thus, the linear polarized light is only emitted from the wire grid polarizer in the direction perpendicular to the longitudinal direction of the grid. If a posture or orientation of the wire grid polarizer is appropriately controlled such that the longitudinal direction of the grid is directed to a desired direction, then it is possible to obtain the polarized light that has an axis of polarized light (direction of the electric field component) directed to a desired direction.

In the following description, the linearly polarized light that has an electric field component in the longitudinal direction of the grid is referred to as an "s polarized light" and the linearly polarized light that has an electric field component in a direction perpendicular to the longitudinal direction of the grid is referred to as "p polarized light" for the sake of description. Generally, a wave that has an electric field perpendicular to an incident plane (plane perpendicular to a reflecting plane, and including incident light and reflected light) is referred to as "s wave," and a wave that has an electric field in parallel to the incident plane is referred to as "p wave." In this specification, the longitudinal direction of the grid is assumed to be parallel to the incident plane (plane of incidence), and the "s polarized light" and the "p polarized light" are defined as described above.

Fundamental indices used to indicate the performances (capabilities) and features (properties) of such polarizer include an extinction ratio ER and a transmittance (light permeability) TR. The extinction ratio ER is a ratio (Ip/Is) of an intensity (Ip) of the p polarized light among the polarized light, which transmits the polarizer, to an intensity (Is) of the s polarized light among the polarized light. Generally, the transmittance TR is a ratio of an energy of the outgoing p polarized light to a total energy of the incident s polarized light and p polarized light (TR=Ip/(Is+Ip)). The extinction ratio ER of an ideal polarizer is infinite, and the transmittance of the ideal polarizer is 0.5 (50%).

LISTING OF REFERENCES

Patent Literatures

PATENT LITERATURE 1: Japanese Patent Application Laid-Open Publication No. 2009-69382
PATENT LITERATURE 2: Japanese Patent Application Laid-Open Publication No. 2007-17762

SUMMARY OF THE INVENTION

When light is used in a display technology, the light in a visible range is often used. In an optical communication technology or the like, the light in an infrared range is often used. When the light is used as energy, the ultraviolet light is often employed. For example, the ultraviolet light is used in a resist exposing process during the photo lithography and in a curing process to cure a UV curable resin. Thus, when the polarized light is used as the energy, it is necessary to prepare (use) the polarized light having a wavelength in the ultraviolet region (UV range).

A more specific example of a display technology that uses the light in recent years is so-called photo-orientation (photo-alignment) that is used in a process of fabricating a liquid crystal display. This technology obtains a desired oriented film (alignment film) in the liquid crystal display by light irradiation. When a film made from a resin such as polyimide is irradiated with the polarized light in the UV range (UV region), molecules in the resin film are oriented (aligned) in the direction of the polarized light, and therefore a photo-oriented film is obtained.

When the photo-orientation process is compared to a mechanical orientation process, which is referred to as rubbing, the photo-orientation process can provide an oriented film having a higher performance. Thus, the photo-orientation process is more used in the method of fabricating the liquid crystal display devices that have a high resolution (high picture quality).

As described above, the polarized light having a shorter wavelength region is needed in a certain type of application. Accordingly, the polarizer for such application is also needed. In reality, however, the polarizer that can polarize the light of the short wavelength region is hardly studied, and no such products are marketed for practical use. In this specification, the short wavelength region (range) is from the shortest wavelength of the visible light (e.g., 450 nm or smaller than 450 nm) to the wavelength region of the ultraviolet light.

When the visible light is used, a polarizing film that has oriented (aligned) absorbing axes in a resin layer thereof is often employed. However, this polarizing film cannot be used for the ultraviolet light because the resin is deteriorated by the ultraviolet light in a short time.

When the ultraviolet light should be polarized, a prism polarizer made from (or that includes) calcite may be used. The prism polarizer is suitable when a small (narrow) area is irradiated with the polarized light such as a laser beam. The prism polarizer is, however, not suitable when a certain size of area (large area) should be irradiated with the polarized light such as in the case of photo-orientation.

The wire grid polarizer is able to emit the polarized light over a certain size of area (large area). A plurality of wire grid polarizers may be arranged such that an even larger area can be irradiated with the polarized light.

As mentioned above, the grid of the wire grid polarizer should be configured such that the linear portions of the grid are spaced from each other at the pitch that is equal to or smaller than the wavelength of the light to be polarized. As the wavelength to be polarized becomes shorter, a finer processing (microprocessing) is required. Conventionally, it is believed that although it is theoretically possible to fabricate the wire grid polarizer for the short wavelength such as the wavelength in the ultraviolet region, it is practically impossible to fabricate because of the difficulty in the required microprocessing. However, the microprocessing technology has developed dramatically in recent years, and is used in, for example, the semiconductor manufacturing process. Today, the wire grid polarizer for the ultraviolet light may be fabricated if relevant technologies are applied.

Nevertheless, there are no developments in practically usable wire grid polarizers for the ultraviolet light. Problems to be encountered upon actual use of the wire grid polarizer for the ultraviolet light are also not known sufficiently. With respect to these points, the inventors carried out extensive studies and experiments on the wire grid polarizers for the ultraviolet light and found that the grid of the wire grid polarizer for the ultraviolet light deteriorated in a way that the wire grid polarizer for the visible light did not encounter. This fact will be described below. It should be noted that the polarizer (polarizing element) of the present invention is not limited to a polarizer that has a grid made from metallic linear portions. In the following description, therefore, the polarizer (polarizing element) of the present invention is generally referred to as "grid polarizer" or "grid polarizing element."

The inventors prepared a grid polarizing element for ultraviolet light. The grid polarizing element included a grid, and the grid had a plurality of linear portions spaced from each other at the intervals equal to or smaller than 400 nm. The inventors carried out experiments to measure the polarizing properties of the grid polarizing element by actually irradiating the grid polarizing element with the ultraviolet light. During the experiments, the inventor confirmed by sight that there was a color change in the linear portions. Further studies revealed that the color change was caused by oxidization that took place in the linear portions. When the grid polarizing element (or the linear portions thereof) had the oxidization, the grid polarizing element suffered from the deterioration of the polarizing properties such as the light permeability and extinction ratio.

The inventors studied the cause of the oxidization in the linear portions, and found that the oxidization gas which was produced upon irradiation of the ultraviolet light was the cause of the oxidization. The "oxidization gas" includes ozone, active species of oxygen and the like, which are produced when oxygen is excited by the ultraviolet light. In this specification, the term "oxidization gas" excludes an oxygen gas at a ground state (normal state).

The present invention is developed in view of the above-described finding and considerations. One object of the present invention is to provide a grid polarizing element that has a structure capable of preventing deteriorations due to the oxidization gas. The grid polarizing element of the invention is preferably used to polarize ultraviolet light.

In order to achieve the object of the present invention, one aspect of the present invention provides a grid polarizing element that is capable of polarizing ultraviolet light. The grid polarizing element includes a transparent substrate, a grid layer provided on the transparent substrate, and a gas blocking layer that covers the grid layer. The grid layer has a plurality of linear portions and shaped like a stripe. Each of the linear portions is made from a material that can be deteriorated when the material is in contact with an oxidization gas which is generated by the ultraviolet light. The gas blocking layer is configured to block the oxidization gas. The blocking layer is configured to close spacing between the linear portions. The gas blocking layer is transparent at a wavelength of light to be polarized.

According to this grid polarizing element, the grid layer is covered with the gas blocking layer that blocks the oxidization gas. The gap (spacing) between each two adjacent linear portions is closed by the gas blocking layer. Therefore, even when the grid polarizing element is used to polarize the ultraviolet light, the linear portions are not deteriorated by the oxidization gas. Thus, an expected polarizing property (polarizing effect) is obtained without deteriorations.

Each of the linear portions may be made from an inorganic dielectric substance that has a light absorbing property. The grid layer may polarize light such that the grid layer absorbs more polarized light of which polarization axis extends in a longitudinal direction of each linear portion than polarized light of which polarization axis is perpendicular to the longitudinal direction of the linear portion, when the light propagates in a thickness direction of the grid layer. This polarizing element is the absorption type polarizing element. Accordingly, an excellent polarizing effect may be expected when polarizing the ultraviolet light.

The gas blocking layer may close the spacing between the linear portions without substantially entering the spacing between the linear portions. With such configuration, the gas blocking layer does not enter the spacing between the linear portions, and therefore an optical constant of the grid layer is not altered beyond the limit.

The gas blocking layer may have a thickness equal to or less than 50% of a width of each linear portion on a lateral face of the linear portion concerned. With such configuration, because the gas blocking layer does not enter the spacing between the linear portions, an optical constant of the grid layer is not altered beyond the limit.

The gas blocking layer may include a plurality of first layers formed on the linear portions respectively and a second layer formed on the first layers. The second layer may be made from a denser film than each of the first layers. With this configuration, because the gas blocking layer has the first layers and the second layer, and the second layer is denser than the first layers, the optical constant change is suppressed even if the gas blocking layer enters the spacing between the linear portions. It is also possible to increase a mechanical strength of the polarizing element.

These and other objects, aspects and advantages of the present invention will become apparent to those skilled in the art from the following detailed description when read and understood in conjunction with the appended claims and drawings.

BRIEF DESCRIPTION OF THE DRAWINGS

FIG. 3 is a schematic front view of the absorption type grid polarizing element shown in FIG. 2, which is useful to describe the function of the grid polarizing element.

FIG. 8A is a diagram to show a result of experiments with respect to a mechanical strength of the polarizing element when a comparative example is used.

FIG. 8B is a diagram to show a result of experiments with respect to the mechanical strength of the polarizing element when a grid polarizing element according to the embodiment of the present invention is used.

DETAILED DESCRIPTION OF THE INVENTION

A preferred embodiment of the present invention will now be described with reference to the accompanying drawings.

Figure 1:
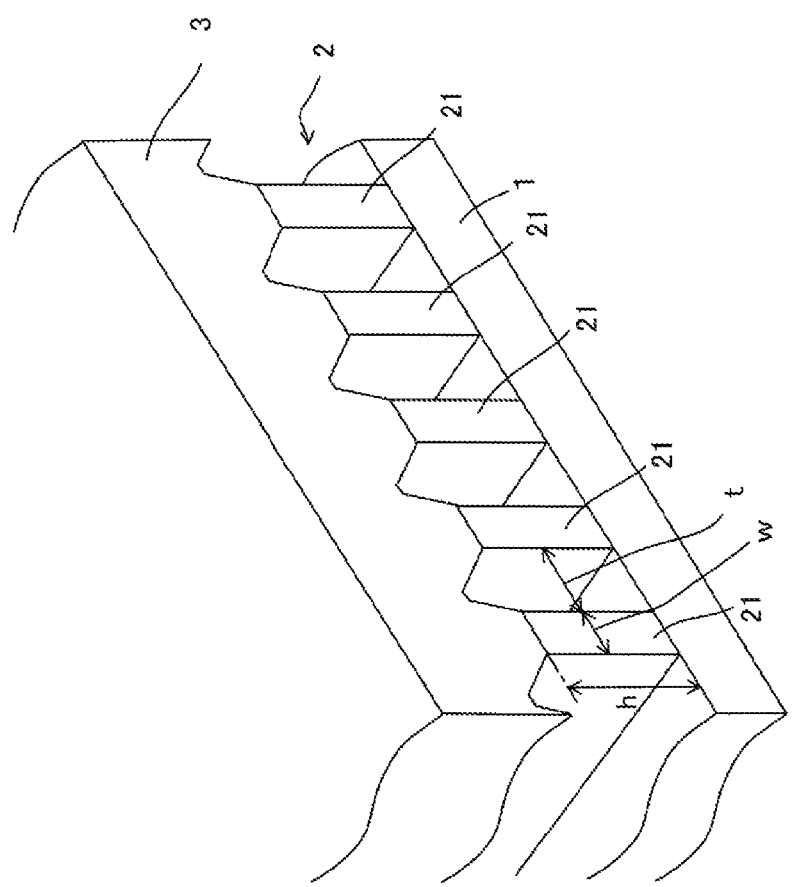
FIG. 1 is a schematic perspective view of a grid polarizing element according to one embodiment of the present invention.

FIG. 1 is a schematic perspective view showing a grid polarizing element according to one embodiment of the present invention. The grid polarizing element shown in FIG. 1 includes a transparent substrate 1 and a grid 2 disposed on the transparent substrate 1.

The transparent substrate 1 is "transparent" because the substrate 1 has sufficient permeability to a wavelength to be polarized (wavelength of light to be polarized by the polarizing element). This embodiment assumes that the wavelength to be polarized is the ultraviolet wavelength (light to be polarized is ultraviolet light). Thus, the material of the transparent substrate 1 is a quartz (silica) glass (e.g., synthetic quarts).

As illustrated in FIG. 1, the grid 2 has a plurality of linear portions 21 that extend in parallel to each other. Thus, the grid 2 has a stripe shape, which can define lines and spaces. The grid 2 has a three-dimensional structure that includes the linear portions 21 and the spacing between each two adjacent linear portions 21, and this three-dimensional structure provides the polarizing effect. Accordingly, the grid 2 is referred to as "grid layer" hereinafter.

In this embodiment, each of the linear portions 21 is made from silicon. In the grid layer 2, the spacing (distance) between each two adjacent linear portions 21 (indicated by "t" in FIG. 1) is equal to or smaller than 400 nm. This is because the grid polarizing element of this embodiment is assumed to be used to polarize the ultraviolet light.

As depicted in FIG. 1, the grid polarizing element of this embodiment also includes a layer 3 that extends over the grid layer 2. The layer 3 is a gas blocking layer that blocks an oxidization gas. The gas blocking layer 3 blocks the oxidization gas such that the oxidization gas does not reach the surface of each linear portion 21.

The gas blocking layer 3 blocks the oxidization gas, but is still able to transmit the light therethrough (i.e., the layer 3 has light permeability). The light permeability of the gas blocking layer 3 sufficiently allows the light to pass therethrough in the range of wavelength to be used (wavelength to be polarized). It is preferred that the gas blocking layer 3 is made from a material that is not deteriorated (damaged) by the oxidization gas. The exemplary material of the gas blocking layer 3 that has such features includes an inorganic material such as a silicon oxide, an aluminum oxide, a magnesium oxide, a zirconium oxide, a hafnium oxide, and a tantalum pentoxide.

When the gas blocking layer 3 is formed, it is preferred that a suitable deposition (film-forming) method may be employed. For example, a layer deposited (layers piled up) by sputtering such as plasma sputtering may be used as the gas blocking layer 3.

In the grid polarizing element of this embodiment, even when the gas present in the atmosphere in which the grid polarizing element is installed is irradiated with the ultraviolet light, and the oxidization gas is generated, this oxidization gas is blocked by the gas blocking layer 3. As a result, the linear portions 21 would not be deteriorated (damaged) by the oxidization gas. Accordingly, the grid polarizing element of this embodiment does not suffer from the problem of being deteriorated by the oxidization gas. Thus, the grid polarizing element of this embodiment does not encounter the problem of the deteriorated optical features and performances due to the oxidization gas. The thickness of the gas blocking layer 3 is approximately 100-500 nm. The thickness is measured from the upper end(s) of the linear portion(s) 21.

The fact of blocking the oxidization gas brings about a particularly significant advantage in relation to the operation principle of the grid polarizing element of this embodiment. This will be described below.

The grid polarizing element of this embodiment is an absorption type polarizer. The absorption type grid polarizing element is developed by the inventors, and is not known to the public. The conventional grid polarizers can be referred to as "reflection type polarizers." The typical reflection type polarizer has the grid layer 2 that transmits the p polarized light and reflects the s polarized light. In contrast, the grid polarizing element of this embodiment has the grid layer 2 that absorbs and attenuates the s polarized light when the s polarized light propagates in the depth direction of the grid layer 2 whereas the p polarized light is not attenuated and transmitted through the grid layer 2.

Figure 2:
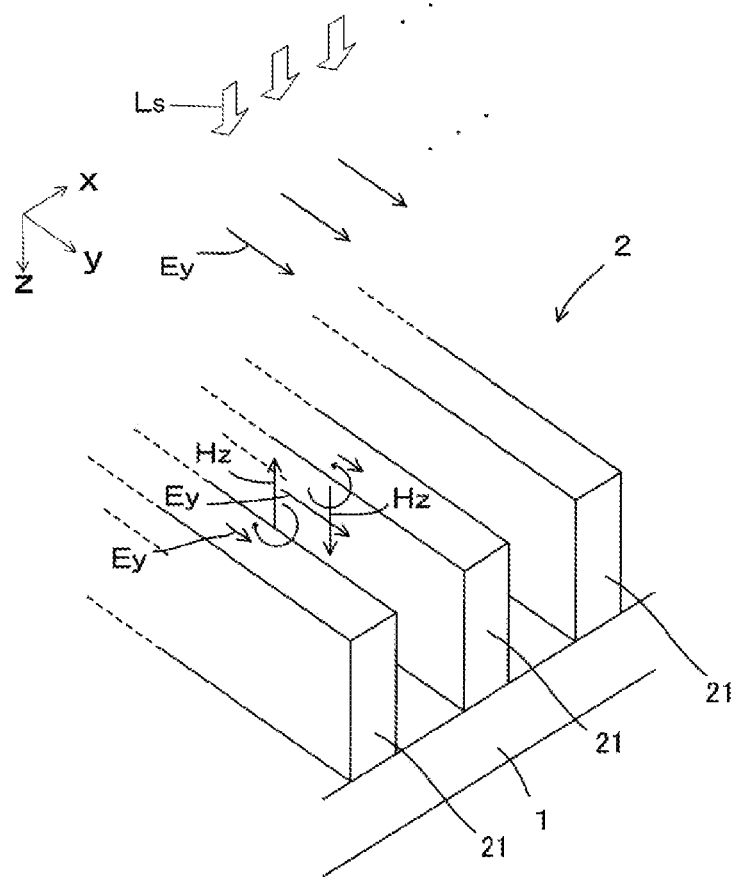
FIG. 2 is a schematic perspective view of an absorption type grid polarizing element according to an embodiment of the present invention, which is useful to describe the function of the grid polarizing element.

Exemplary functions of the absorption type grid polarizing element will be described in detail with reference to FIGS. 2 and 3. FIGS. 2 and 3 illustrate a model of the absorption type grid polarizing element according to the embodiment. Specifically, FIG. 2 is a schematic perspective view, and FIG. 3 is a schematic front view. In FIGS. 2 and 3, it should be assumed, for the sake of description, that the light propagates from the top of the drawing sheet toward the bottom of the drawing sheet, and this direction is referred to as "z-direction." The extending direction of each linear portion 21 of the grid layer 2 is referred to as "y-direction." Accordingly, the s polarized light (designated at "Ls" in FIG. 2) has an electric field component Ey. The magnetic field component of the s polarized light is present in the x-direction (designated at "Hx" in FIG. 3).

When the s polarized light enters the grid layer 2 of the grid polarizing element, the electric field Ey of the s polarized light is weakened due to the dielectric constants (permittivities) of the linear portions 21 of the grid layer 2. It should be noted that the medium (substance) between each two adjacent linear portions 21 is generally the air. Thus, the dielectric constant of the medium between the neighboring linear portions 21 is smaller than the linear portions 21. Accordingly, the electric field Ey is less weakened in the spacing between the linear portions 21 than in the linear portions 21.

As a result, a rotating component of the electric field Ey is generated in the x-y plane. Then, two opposite magnetic fields Hz are induced in the z-direction (FIG. 2) depending upon the intensity of rotation of the magnetic field in the x-y plane. This phenomenon is defined by the Maxwell's equation (1) that corresponds to the Faraday's electromagnetic induction.

$$RotE = -\frac{\partial B}{\partial t} \quad (1)$$

Therefore, one of the two magnetic fields Hz is directed in the forward direction of the light propagation and the other magnetic field Hz is directed backward, with the border being the highest magnetic field Ey at the center between each two adjacent linear portions 21. Although not shown in FIG. 2, the magnetic field Hx in the x-direction has the same phase as the electric field Ey and is directed to the negative side of the x-axis. The magnetic field component Hx in the x-direction is pulled by the generated magnetic field component Hz of the z-direction such that the magnetic field component Hx deforms like a wave.

As the magnetic field component Hx waves (rotates) in this manner, another electric field is generated in the y-direction in FIG. 2 in accordance with the Maxwell's equation (2) that corresponds to the Ampere-Maxwell's law.

$$RotH = j + \varepsilon \frac{\partial E}{\partial t} \quad (2)$$

This is schematically illustrated in FIG. 3. The waving (rotation) of the x-direction magnetic field component Hx creates a new electric field Ey.

As depicted in FIG. 3, the waving (rotation) of the magnetic field component Hx in the x-z plane generates in each of the linear portions 21 the first electric field Ey that is directed perpendicularly upward from the drawing sheet of FIG. 3 (toward a reader of this specification) and generates the second electric field Ey that is directed in the opposite direction, in each of the gaps (spacing) between the linear portions 21. Because the original electric field Ey of the incident s polarized light is directed perpendicularly upward from the drawing sheet of FIG. 3, the second electric field Ey between the linear portions 21 is counterbalanced by the rotation of the magnetic field such that the wave of the magnetic field is divided into smaller parts. Consequently, the first electric field Ey is locally present (localized) in each of the linear portions 21 of the grid layer 2. The energy of the s polarized light is absorbed by the linear portions 21 in accordance with the material of the linear portions 21, and is extinguished (reduced) while the s polarized light propagates in the grid layer 2.

The electric field component of the p polarized light is directed in the x-direction (Ex). However, when viewed in the y-direction, the dielectric constant distribution is uniform, and therefore the rotating component of the electric field is not generated substantially. For the p polarized light, therefore, the localization of the electric field in the grid layer 2 does not occur, and the attenuation of the light in the linear portions 21 does not occur. This is different from the s polarized light. In summary, for the s polarized light, the waving (rotation) of the magnetic field component Hx is caused such that the electric field Ey is localized in the respective linear portions 21, and the s polarized light is absorbed in the linear portions 21 such that the s polarized light is selectively attenuated. This is the operation principle of the grid polarizing element of this embodiment. Experiments and studies of the inventors revealed that the above-described absorption type grid polarizing element had a high permeability and a high extinction ratio to the ultraviolet light. Thus, the absorption type grid polarizing element is very suitable as the polarizer for the ultraviolet light.

When the linear portions 21 of the absorption type grid polarizing element are subjected to the oxidization gas such as active oxygen species and ozone, and deteriorated, then the dielectric constant changes, and in turn the optical constant (complex refractive index) changes. As understood from the foregoing, the absorption type grid polarizing element obtains a desired extinction ratio and a desired transmittance (permeability) by selecting an appropriate optical constant (particularly, an attenuation coefficient). Thus, if the optical constant changes due to the deterioration, the absorption type grid polarizing element is often unable to obtain a desired extinction ratio and a desired transmittance. Typically, the deterioration caused by the oxidization gas is oxidation. If the linear portions 21 are made from silicon, the deterioration means that the linear portions 21 become a silicon oxide and the optical constant changes.

In addition, there is a possibility that the optical constant may change as the linear portions 21 become an oxide having a different oxidation number, or that the optical constant may change as the oxidation condition changes. One example of the latter will be described. The linear portions 21 of the grid layer 2 are prepared by deposition and photolithography (will be described). When the formed film is an oxide film, the formed film contains oxygen vacancy (grid vacancy of oxygen) to a greater or less extent. Because the oxygen vacancy behaves as an impurity state (level) in a solid matter, this makes a difference from ideal optical features and characteristics (optical characteristics when there is no vacancy). In practice, a grid manufacturing person firstly assumes what the grid will look like as a result of actual film deposition. Based on the assumed optical characteristics, the grid manufacturing person decides (designs) the size, dimensions, shape and the like of the grid 2. However, the oxidization gas restores (repairs) the oxygen vacancy if the oxidization gas exists in the environment, and therefore an amount of oxygen vacancy decreases over time, which eventually changes the optical constant. This change in the optical constant may result in the deterioration of the polarizing characteristics, and it can be said that this is the deterioration caused by the oxidization gas.

In any case, the grid polarizing element of this embodiment includes the gas blocking layer 3, and therefore the grid polarizing element of this embodiment does not suffer from the deterioration that would otherwise be caused by the oxidization gas. Thus, the absorption type grid polarizing element can continuously function and operate in a desired manner.

Figure 4A:
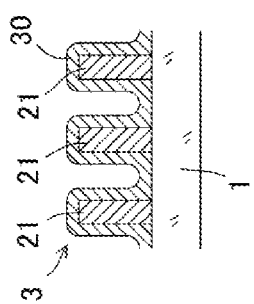
FIGS. 4A-4C is a set of schematic front cross-sectional views of three gas blocking layers, respectively, which are useful to describe superiority and inferiority of their structures.
Figure 4B:
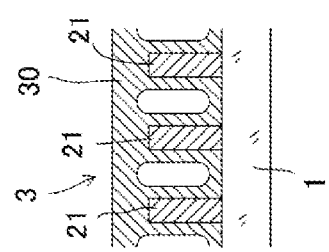
Figure 4C:
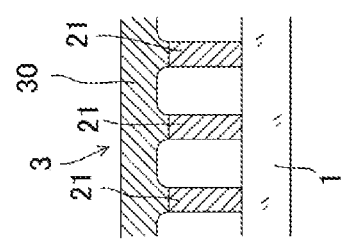

The inventors found that when the gas blocking layer 3 was the deterioration preventing component, the gas blocking layer 3 played an important role to obtain a desired polarizing property, when looked at from a different point of view. This point will be described with reference to FIGS. 4A-4C. FIGS. 4A-4c are schematic front cross-sectional views of three different gas blocking layers 3, respectively, to illustrate superiority and inferiority of the structures of the gas blocking layers 3.

As described above, the gas blocking layer 3 of this embodiment may preferably be fabricated by a deposition method. A plurality of deposition methods are available to prepare the gas blocking layer 3, and the resulting structures of the films 30 of the gas blocking layers 3 may differ from each other in accordance with the deposition methods. One type of the structure of the film 30 of the gas blocking layer 3 is shown in FIG. 4A. The film 30 is formed on the upper face of each linear portion 21 as well as on the lateral faces of the liner portion 30 in FIG. 4A. Another type is shown in FIG. 4B. The film 30 is formed on the upper face and lateral faces of each linear portion 21, and the spacing between each two adjacent linear portions 21 is closed by the film 30 in FIG. 4B. Still another type is shown in FIG. 4C. No film 30 is formed on the lateral faces of each linear portion 21, and the film 30 is formed on the upper face of the linear portion 21 and extends such that the spacing between each two adjacent linear portions 21 is closed by the film 30 as shown in FIG. 4C.

The studies and experiments conducted by the inventors revealed that the structures of FIGS. 4A and 4B were not suitable, and the structure of FIG. 4C was preferable. With the structures of FIGS. 4A and 4B, the film 30 extends in the spacing between the linear portions 21. As a result, the dielectric constant in the spacing between the linear portions 21 is altered. When the dimensions of the gas blocking layer 3 are decided, it is assumed that the spacing between the linear portions 21 is the air, i.e., the dielectric constant is one. The material and dimensions of the linear portions 21 are also decided on the assumption that the spacing between the linear portions 21 is the air. When the film 30 extends in this spacing, a desired spectrum property, including an extinction ratio and permeability, is not obtained. Therefore, the structure of FIG. 4C is preferred.

When the gas blocking layer 3 having the structure shown in FIG. 4C is prepared by a deposition method, some cares may be taken. If a usual deposition method is employed without certain cares, the film material (particles that will form the film) would enter the spacing between the linear portions 21, and therefore the film 30 might be accumulated on the lateral faces of the linear portions 21. This would result in the structure shown in FIG. 4A or 4B.

Figure 5A:
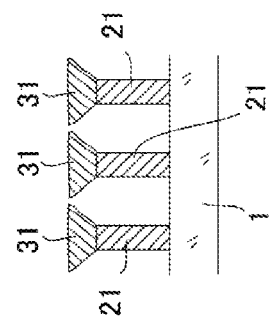
FIGS. 5A-5C is a set of schematic front cross-sectional views useful to illustrate a preferred method of forming the gas blocking layer.
Figure 5B:
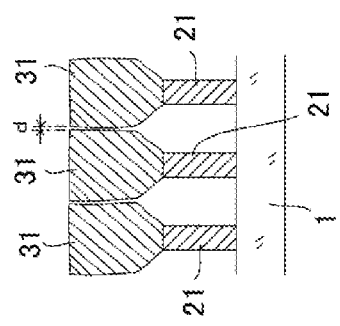
Figure 5C:
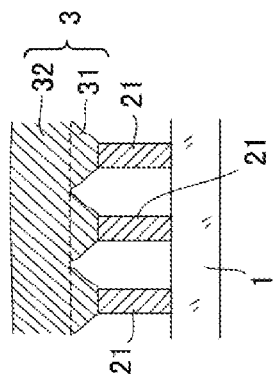

A preferred deposition method to prepare the gas blocking layer 3 having the structure of FIG. 4C is a sputtering-based deposition method. In this deposition method, migration of the sputtered particles is preferably adjusted. This will be described with reference to FIGS. 5A-5C. FIGS. 5A-5C is a set of schematic front cross-sectional views useful to illustrate a preferred method of forming the gas blocking layer 3.

The gas blocking layer 3 is formed after the linear portions 21 are formed on the transparent substrate 1. When the deposition of the gas blocking layer 3 is performed by sputtering, a target, which is made from the material of the gas blocking layer 3, is used. Because the gas blocking layer 3 is a dielectric such as a silicon oxide, a high-frequency (radio frequency) plasma sputtering is employed.

The grid polarizing element of this embodiment is used for the ultraviolet light. Thus, the gap (spacing) t between each two adjacent linear portions 21 is smaller than a grid polarizing element for the visible light. Thus, the sputtered particles are relatively difficult to enter the spacing between the linear portions 21. Nevertheless, if the sputtered particles arrive at (are sputtered on) the lateral faces of the linear portions 21 and have a certain thickness (certain coating thickness), the sputtered particles migrate in this thickness in accordance with the energy of the particles sputtered. If the migration of the sputtered particles is large, the film material may enter the spacing between the linear portions and stay on the lateral faces of the linear portions 21 in spite of the small size of the spacing. Then, the film 30 may be accumulated on the lateral faces of the film 30 as shown in FIGS. 4A and 4B.

In order to suppress the migration of the sputtered particles, the energy of the electrically charged particles in the plasma that hit the target is made smaller, and the energy of the sputtered particles is made smaller. If this is done, the film 31 is condensed (collected) and accumulated on the upper face of each linear portion 21 as shown in FIG. 5A. Consequently, the film 31 is not accumulated on the later faces of the linear portions 21, or the film 31 may be accumulated in a trace amount in case accumulation occurs.

However, when the entire deposition is performed with the sputtered particles having a small energy, the film 31 on each linear portion 31 grows upward only, as shown in FIG. 5B. Thus, the film 31 is not accumulated such that the film 31 closes the spacing between the linear portions 21. Accordingly, the resulting gas blocking layer 3 has an inappropriate film structure.

If the energy of the sputtered particles is increased during the deposition process such that the sputtered particles can migrate largely, then the film 32 can grow laterally, and the film 32 is accumulated to close the spacing between the linear portions 21, as shown in FIG. 5C. Thus, the resulting gas blocking layer 3 has a preferred film structure.

When the deposition process is performed such that the energy of the sputtered particles is altered at a certain point in time, i.e., the sputtering is carried out at two stages (in two sub-steps), in the above-described manner, it is possible to suppress the film accumulation on the lateral faces of the linear portions 21, and to close the spacing between the linear portions 21 with the two kinds of films 31 and 32 as shown in FIG. 5C. This approach is preferred as the method of fabricating the grid polarizing element of this embodiment. This two-stage deposition may be performed by changing a discharge electric power for sputtering (electric power to be applied to the target) and/or changing a deposition temperature (temperature of the transparent substrate 1 during the deposition). One example will be described in connection with a high frequency plasma sputtering. The plasma is formed with a high frequency (e.g., 13.56 MHz), and used in the sputtering process. Firstly, the electric power density (area density) on a surface (surface to be sputtered) of the target is set to approximately 2 W/cm$^2$ to 9 W/cm$^2$, and the deposition temperature is set to the room temperature. The deposition of first stage is performed under this condition. Subsequently, the electric power density is increased to approximately 9 W/cm$^2$ to 18 W/cm$^2$, and the deposition temperature is set to be higher than the room temperature (e.g., 100 degrees C.). The deposition of second stage is performed under this condition.

When the deposition process is performed in the two stages as described above, the fineness (denseness) of the film changes (the fineness changes in the produced film). Specifically, the film that is formed by the large migration of the sputtered particles has the greater fineness (is denser) than the film that is formed by the small migration of the sputtered particles. Thus, whether or not the film is fabricated by the two-stage deposition can be determined by analyzing the formed gas blocking layer 3 with a suitable method. For example, the prepared grid polarizing element is cut, and the cut surface is observed by an SEM (Scanning Electron Microscope) to see (know, confirm) the fineness of the film based on the contrast differences in the SEM image. The SEM irradiates a sample with an electron beam in a vacuum chamber and mainly obtains secondary electrons emitted from the sample to create an image of the sample.

The secondary electrons scatter inside the sample in a bulk direction, and then is released into the vacuum. Thus, the secondary electrons can reflect the fineness of the sample (fineness of the film). The film created by the large migration of the sputtered particles has a large fineness, i.e., has a large density and is uniform. The contract in the SEM image for this film is also uniform. On the other hand, the film created by the small migration of the sputtered particles is coarse, i.e., has irregularities in the density (fineness). The contract in the SEM image for this film also has irregularities.

The fact that the film has the different fineness is important for the polarizing property (characteristics). Even when the film material enters the spacing between the linear portions 21 during the formation of the films 31 and 32 of the gas blocking layer 3, and the formed film 31 is thin, the polarizing property is not deteriorated very much if the film 31 is not a highly fine film because the refractive index of such film is smaller than the film having a high fineness. If the film 31 is referred to (redefined) as the first film and the film 32 is referred to as the second film, and the gas blocking layer 3 has the first layer 31 having a low(er) fineness (density) and the second layer 32 having a high(er) fineness (density) and formed on the first layer 31, then the polarizing property is less adversely affected by a film formed on the lateral faces of the linear portions 21 even if such film is formed on the lateral faces of the linear portions 21 during the formation of the first layer 31. Thus, the influence of the film formed on the lateral faces of the linear portions 21 is reduced.

Figure 6:
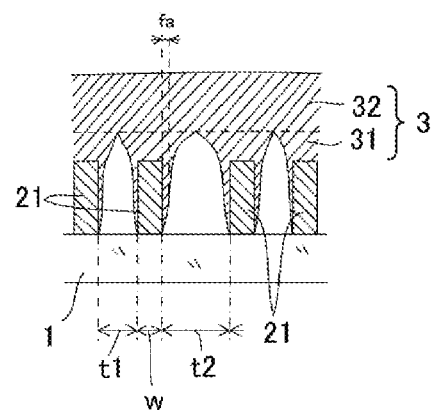
FIG. 6 is a schematic cross-sectional view useful to describe an upper limit of accumulation of a film on a lateral face of a linear portion of the gas blocking layer.

It should be noted that although the desired spectrum property may not be obtained if the film is accumulated on the lateral faces of the linear portions 21, there is practically no problem in terms of the spectrum property if an amount of accumulation of such film on the lateral faces of the linear portions 21 is small. Generally speaking, if the thickness of the accumulated film is equal to or smaller than 50% of the width of the linear portion 21 (more preferably, equal to or smaller than 30% of the width of the linear portion 21), then the influence of such accumulated film on the polarizing property (characteristics) of the polarizing element is sufficiently suppressed (may be neglected; practically no problem is encountered). This will be described in detail with reference to FIG. 6. FIG. 6 is a schematic front cross-sectional view useful to describe the upper limit of the accumulation on the lateral faces of the linear portions 21.

As depicted in FIG. 6, when the film is accumulated on the lateral faces of the linear portion 21, usually the thickness of the accumulated film is not uniform in the height direction of the linear portion 21. Specifically, the accumulated film is thicker in the upper section of the linear portion 21 and thinner in the lower section. With such film accumulation on the lateral faces of the linear portion 21, the influence of the accumulated film formed on the lateral faces of the linear portion 21 on the polarizing property is sufficiently (negligibly) suppressed if the average thickness of the accumulated film on the entire lateral faces of the linear portion 21 is equal to or smaller than approximately 50% of the width w of the linear portion 21 (more preferably approximately 30%). Thus, it is practically tolerable if the average thickness of the accumulated film on the lateral faces of the linear portion 21 is no greater than about 50% (preferably about 30%) of the width w of the linear portion 21.

As understood from FIG. 6, the gap (spacing) between one pair of two adjacent linear portions 21 may be altered intentionally from a next pair of two adjacent linear portions 21. In FIG. 6, the gap t1 is different from the gap t2. The assignee filed two patent applications in Japan (Patent Applications No. 2013-75246 and No. 2013-143119) that disclosed the polarizing element having the alternately altered gaps for the purpose of improving the polarizing property under certain conditions. If the instant application intends to have the same advantage (same or similar improvements in the polarizing property) as these two Japanese patent applications, then the gap between one pair of linear portions 21 may be the gap t1 and the gap between the next pair of linear portions 21 may be the gap (larger gap) t2, as illustrated in FIG. 6.

In this configuration, an amount of accumulation of the film on the lateral faces of the linear portion 21 is generally greater in the large gap t2 than in the smaller gap t1. Thus, the average thickness fa of the film formed on the linear portion lateral face in the larger gap t2 is made equal to or smaller than 50% of the width w of the linear portion 21 (preferably equal to or smaller than 30% of the width w). Then, the average thickness of the film formed on the linear portion lateral face in the smaller gap t1 becomes smaller than 50% (preferably smaller than 30%) of the width w of the linear portion 21. Accordingly, the influences exerted on the polarizing property by the films formed on the lateral faces of the linear portions 21 can be suppressed sufficiently.

It is important that the second layer 32 of the gas blocking layer 3 is highly dense (has a high density) when it is considered that the gas blocking layer 3 may also serve as a mechanical protection layer for the grid layer 2. The gas blocking layer 3 may be able to function as a physically protecting layer for the grid layer 2. In the grid polarizing element of this embodiment, the second layer 32 is preferred as the protection layer because the upper layer (second layer) 32 is highly dense in the gas blocking layer 3 and has a high(er) strength.

If even higher polarizing properties (higher extinction ratio and higher permeability) are expected in the grid polarizing element, the aspect ratio of the linear portion 21 (ratio of the height h (FIG. 1) to the width w of the linear portion 21) tends to be even greater. In particular, this tendency is significant when the polarizing element is the absorption type grid polarizing element. As the aspect ratio becomes greater, the light propagation distance that accompanies the absorption of the s polarized light becomes longer, and therefore the extinction ratio increases. At the same time, the linear portion 21 that has a high aspect ratio has a reduced mechanical strength, and therefore such linear portion 21 needs to have a sufficient protection layer.

Although the foregoing description mentions that the structure shown in FIG. 5B is not appropriate because the gas blocking layer 3 is not continuous (the layers 31 are disconnected from each other, and there are gaps d), the structure shown in FIG. 5B may be acceptable when the gap d between the layers 31 is small enough to block the gas flow through the gap d (if the conductance is small enough). In practice, when the gap d between the layers 31 is equal to or smaller than, for example, 10 nm in FIG. 5B, the gas flow through the gap d is substantially prohibited. Thus, the layers 31 having such structure may practically be referred to as "gas blocking layer."

It should be noted that although the gas blocking layer 3 covers the grid layer 2, it is satisfactory if the gas blocking layer 3 extends over that face of the grid layer 2 which is opposite the transparent substrate 1. In other words, it is satisfactory if the gas blocking layer 3 is formed, in the laminated form, on top of each linear portion 21 (opposite the transparent substrate 1), or extends upward from the top of each linear portion 21. The linear portions 21 are spaced from each other at the ends in the longitudinal direction of the linear portions 21, and the gas blocking layer 3 does not cover the linear portions 3 at the longitudinal ends of the linear portions 21. The inventors confirmed that the deterioration would not be caused by the oxidation gas (practically no problem) even if the gas blocking layer 3 did not cover the linear portions 21 at the longitudinal ends of the linear portions 21. It is assumed that this is because the openings made at the longitudinal ends of the linear portions 21 are small spots, and the gas conductance is small. It should also be noted that the gas blocking layer 3 may cover the linear portions 21 at the longitudinal ends of the linear portions 21. For such configuration, a technique for forming an SOG (Spin On Glass) film may be applied. With this configuration, it is also preferred that no film is formed in the spacing between the linear portions 21.

The grid layer 2 may be formed in the following manner. For example, firstly a sputtering process, a CVD process (e.g., ALD (Atomic Layer Deposition) process or the like) or other film-forming process is used to form a film on the transparent substrate 1. After the film is formed, a line-and-spacing pattern is created on (in) the film with a photolithography, so as to provide the grid layer 2. The material of the linear portions 21 is silicon in the foregoing description. Alternatively, the material of the linear portions 21 may be a titanium oxide or the like. When the polarizing element is used for polarizing the light in the UV region (wavelength of the light is equal to or shorter than 400 nm), the width w of each linear portion 21 is approximately 10-50 nm, and the gap t between each two adjacent linear portions 21 is approximately 30-150 nm.

The grid polarizing element of this embodiment may preferably be used when an object is irradiated with the ultraviolet light that is polarized, as in the case of the photo-orientation (photo-alignment). The light from the ultraviolet light source is converted to substantially parallel light by a suitable optical system (e.g., mirror that has a parabolic cross-sectional shape), and then the parallel ultraviolet light is incident to the grid polarizing element. As described above, the s polarized light is more absorbed by the grid polarizing element in a selective manner, and the p polarized light is more transmitted. Thus, the object is more irradiated with the p polarized light. This specification also discloses a method of polarizing the ultraviolet light, and the above description is part of the disclosure for the method of polarizing the ultraviolet light.

EXAMPLES

Now, experimental results of examples of the above-described embodiment of the invention (working examples) will be described together with comparative examples.

When the gas blocking layer 3 is formed from a silicon oxide as described above, a target made from a silicon oxide and a high-frequency plasma etching machine are used to form a silicon oxide film for the gas blocking layer 3. The sputtering gas is a mixture of argon gas and oxygen. For example, the sputtering gas contains 25 sccm (standard cubic centimeter per minute) of argon and 5 sccm of oxygen. The pressure of the atmosphere is approximately 0.1 Pa.

The step of forming (depositing) the first layer 31 was performed at the normal temperature, the electric power applied to the target was 300 W, and the deposition time was 1,200 seconds. The step of forming the second layer 32 was performed at 100 degrees C., the electric power applied to the target was 600 W, and the deposition time was 2,500 seconds. The high-frequency plasma etching was performed at 13.56 MHz for both of the first and second layers 31 and 32. The sputtering gas was a mixture of argon gas and oxygen, as mentioned above, for both of the first and second layers 31 and 32. The flow rates of the argon gas and oxygen were fixed to the above-mentioned values (25 sccm and 5 sccm), and the pressure of the atmosphere was fixed to the above-mentioned value (about 0.1 Pa) for both of the first and second layers 31 and 32.

In the step of forming the second layer 32, a self-biasing voltage was applied to the transparent substrate 1 in order to facilitate the migration of the sputtered particles. Specifically, a high frequency electric power (13.56 MHz and 100 W) was applied to the transparent substrate 1, and the interaction with the plasma caused a self-biasing voltage to be applied to the transparent substrate 1. The self-biasing voltage extracted ions from the plasma, and the ions were incident into the film during the formation of the film. The energy of the ions facilitated the migration of the sputtered particles.

Figure 7A:
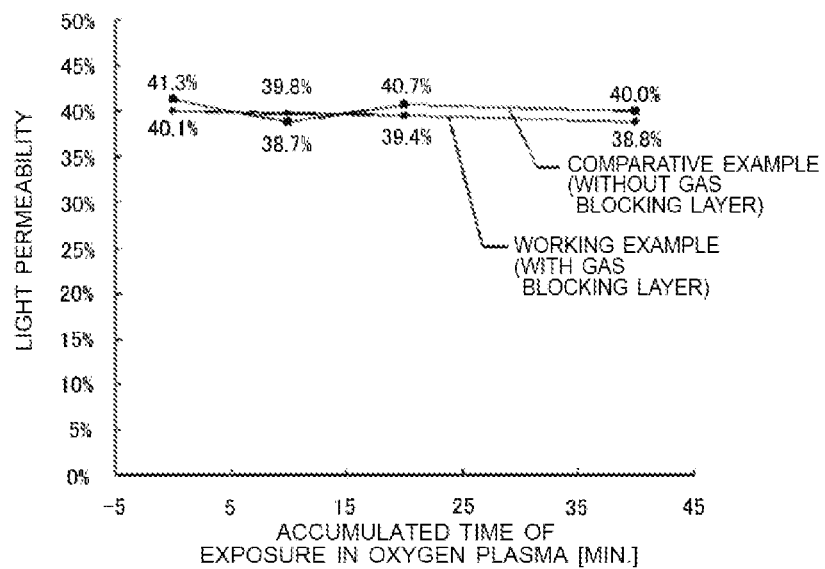
FIG. 7A shows a result of experiments with respect to light permeability (transmissivity, transmittance) when the grid polarizing element of the embodiment of the present invention is compared to a comparative example.
Figure 7B:
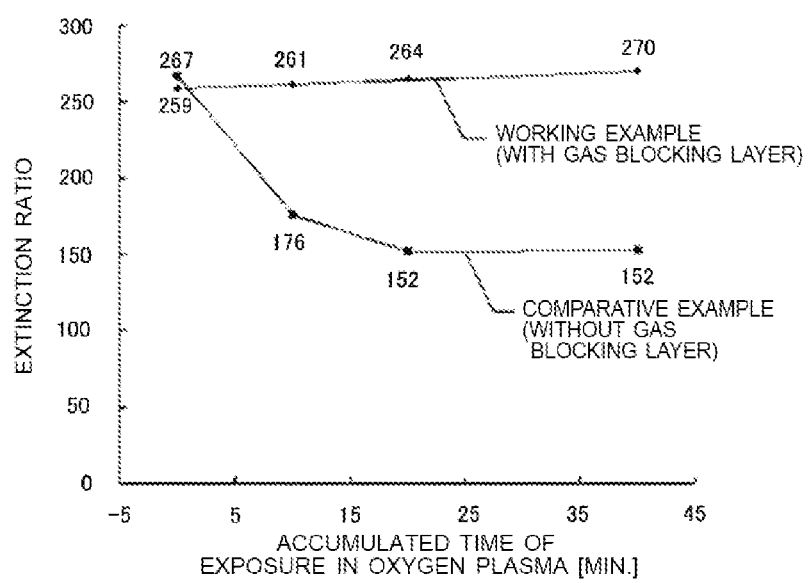
FIG. 7B shows another result of experiments with respect to an extinction ratio when the grid polarizing element of the embodiment of the present invention is compared to a comparative example.

Under the above-mentioned conditions, the silicon oxide film was formed to have the thickness of about 250 nm, thereby forming the gas blocking layer 3. The second layer 32 of the gas blocking layer 3 was a sufficiently continuous layer. In other words, the second layer 32 on each first layer 31 is sufficiently connected to the next second layer 32 on the next first layer 31. In order to evaluate the gas blocking layer 3, the inventors prepared a grid polarizing element that did not have the gas blocking layer 3, and compared the grid polarizing element having the gas blocking layer 3 (working example of the invention) to the grid polarizing element having no gas blocking layer (comparative example). The results of this comparison are shown in FIGS. 7A, 7B, 8A and 8B. The experimental results of the grid polarizing element according to the embodiment of the invention are shown in FIGS. 7A, 7B and 8B.

In this experiment, an environment that was similar to when the object was irradiated with the ultraviolet light was created by disposing the grid polarizing element in an oxygen plasma. Specifically, an ICP (Inductively-Coupling Plasma) etching device was used to expose the grid polarizing element having the gas blocking layer 3 and the grid polarizing element having no gas blocking layer to the oxygen plasma for a prescribed time respectively. In the oxygen plasma, free oxygen (atomic oxygen), single oxygen, ozone and other oxidization gas are produced, and therefore the oxygen plasma provides an environment that is similar to when the light source device emits the ultraviolet light.

FIG. 7A shows the experimental results of the relationship between the light permeability and the accumulated time of exposure in the oxygen plasma atmosphere with respect to a grid polarizing element having the gas blocking layer 3 (working example) and a grid polarizing element having no gas blocking layer (comparative example). FIG. 7B shows the experimental results of the relationship between the extinction ratio and the accumulated time of exposure in the oxygen plasma atmosphere with respect to the grid polarizing element having the gas blocking layer 3 and the grid polarizing element having no gas blocking layer. As understood from FIG. 7A, the grid polarizing element having the gas blocking layer 3 is little different from the grid polarizing element having no gas blocking layer in terms of light permeability, but as understood from FIG. 7B, the grid polarizing element having the gas blocking layer 3 is very different from the grid polarizing element having no gas blocking layer in terms of the extinction ratio. As shown in FIG. 7B, the extinction ratio of the comparative example (grid polarizing element having no gas blocking layer 3) decreased more than 30% when the grid polarizing element was exposed to the oxygen plasma for about ten minutes, and decreased more than 40% when the grid polarizing element is exposed to the oxygen plasma for about twenty minutes. On the contrary, the extinction ratio of the embodiment of the invention (grid polarizing element having the gas blocking layer 3) did not decrease at all when the grid polarizing element was exposed to the oxygen plasma for about 40 minutes.

FIGS. 8A and 8B show the difference between the grid polarizing element having the gas blocking layer 3 and the grid polarizing element having no gas blocking layer 3 in terms of mechanical strength. FIG. 8A shows the experimental results of the grid polarizing element having no gas blocking layer 3 with regard to the light permeability and the extinction ratio, and FIG. 8B shows the experimental results of the grid polarizing element having the gas blocking layer 3 with regard to the light permeability and the extinction ratio. In FIGS. 8A and 8B, the expression "without load" means no mechanical load applied to the polarizing element, and the expression "with load" means a certain mechanical load applied to the polarizing element. In this particular experiment, the light permeability and the extinction ratio of "with load" are the values measured after an adult male took the grid polarizing element with his strong fingers, and rubbed the grid polarizing element against his hand.

As shown in FIG. 8A, when a mechanical load was applied to the grid polarizing element having no gas blocking layer 3, the light permeability dropped about 8%. The extinction ratio of the grid polarizing element having no gas blocking layer 3 dramatically dropped to about 1/100 when the mechanical load was applied to the grid polarizing element. On the other hand, as shown in FIG. 8B, the light permeability and the extinction ratio of the grid polarizing element having the gas blocking layer 3 dropped only slightly when the mechanical load was applied to the grid polarizing element. Therefore, it was confirmed that the grid polarizing element having the gas blocking layer 3 had an excellent mechanical strength.

While certain embodiments have been described, these embodiments have been presented by way of example only, and are not intended to limit the scope of the present invention. The novel polarizing element described herein may be embodied in a variety of other forms; furthermore, various omissions, substitutions and changes in the form of the polarizing element described herein may be made without departing from the gist of the present invention. The accompanying claims and their equivalents are intended to cover such forms or modifications as would fall within the scope and gist of the present invention.

The present application is based upon and claims the benefit of a priority from Japanese Patent Application No. 2013-255600, filed Dec. 11, 2013, and the entire content of which is incorporated herein by reference.

What is claimed is:

1. A grid polarizing element that is capable of polarizing ultraviolet light, comprising:
   a transparent substrate;
   a grid layer provided on the transparent substrate; and
   a gas blocking layer that covers the grid layer,
   the grid layer having a plurality of linear portions and shaped like a stripe,
   each of the linear portions being made from a material that can be deteriorated when the material is in contact with an oxidization gas which is generated by ultraviolet light,
   the gas blocking layer being configured to block the oxidization gas, the gas blocking layer closing spacing between the linear portions,
   the gas blocking layer being transparent at a wavelength of light to be polarized, and the gas blocking layer including a plurality of first layers formed on said plurality of linear portions, respectively, such that one first layer is formed on one linear portion, and a second layer formed on the plurality of first layers, the second layer having a denser structure than each said first layer, the second layer being made from a same material as each said first layer, each said first layer having a first refractive index, said second layer having a second refractive index, the second refractive index being greater than the first refractive index.

2. The grid polarizing element according to claim 1, wherein each said linear portion is made from an inorganic dielectric substance that has a light absorbing property, and the grid layer polarizes light such that the grid layer absorbs more polarized light of which polarization axis extends in a longitudinal direction of each said linear portion than polarized light of which polarization axis is perpendicular to the longitudinal direction of the linear portion, when the light propagates in a thickness direction of the grid layer.

3. The grid polarizing element according to claim 2, wherein the gas blocking layer closes the spacing between the linear portions without substantially entering the spacing between the linear portions.

4. The grid polarizing element according to claim 3, wherein the gas blocking layer having a thickness equal to or less than 50% of a width of each said linear portion on a lateral face of each said linear portion.

5. The grid polarizing element according to claim 1, wherein the gas blocking layer closes the spacing between the linear portions without substantially entering the spacing between the linear portions.

6. The grid polarizing element according to claim 5, wherein the gas blocking layer has a thickness equal to or less than 50% of a width of each said linear portion on a lateral face of each said linear portion.

7. The grid polarizing element according to claim 1, wherein said plurality of linear portions are arranged at different intervals.

8. The grid polarizing element according to claim 1, wherein said plurality of linear portions are arranged at equal intervals.

9. The grid polarizing element according to claim 1, wherein said gas blocking layer includes a dielectric.

10. The grid polarizing element according to claim 1, wherein said plurality of linear portions are made from a non-metal material.

11. A method of making a grid polarizing element of claim 1, the method comprising:
   preparing a transparent substrate;
   forming a grid layer on the transparent substrate such that the grid layer has a plurality of linear portions arranged like a stripe, each of the linear portions being made from a material that is deteriorated when the material is in contact with an oxidization gas which is generated by ultraviolet light;

forming a plurality of first layers on said plurality of linear portions respectively such that one first layer is formed on one linear portion, said plurality of first layers being transparent at a wavelength of light to be polarized, each said first layer having a first refractive index; and forming a second layer on the plurality of first layers such that said plurality of first layers and the second layer provide, in combination, a gas blocking layer that closes spacing between the linear portions to block the oxidation gas, the second layer having a denser structure than each said first layer, the second layer being made from a same material as each said first layer, said second layer being transparent at the wavelength of light to be polarized, the second layer having a second refractive index, and the second refractive index being greater than the first refractive index.

12. The method according to claim 11, wherein said forming a plurality of first layers is carried out by a first plasma sputtering with a first level of energy, and said forming a second layer is carried out by a second plasma sputtering with a second level of energy that is greater than the first level of energy.

13. The method according to claim 12, wherein said energy is an electricity density with a unit of $W/cm^2$.

* * * * *